United States Patent [19]

Takabayashi

[11] Patent Number: 4,839,246

[45] Date of Patent: Jun. 13, 1989

[54] GENERATOR SYSTEM UTILIZING A FUEL CELL

[75] Inventor: Yasuhiro Takabayashi, Kawasaki, Japan

[73] Assignee: Fuji Electric Co., Ltd., Kawasaki, Japan

[21] Appl. No.: 195,960

[22] Filed: May 19, 1988

[30] Foreign Application Priority Data

May 20, 1987 [JP] Japan .................................. 62-121147

[51] Int. Cl.$^4$ .............................................. H01M 8/04
[52] U.S. Cl. ........................................ 429/12; 429/13; 429/23
[58] Field of Search ....................... 429/12, 13, 17, 22, 429/23, 9

[56] References Cited

U.S. PATENT DOCUMENTS

| | | | |
|---|---|---|---|
| 3,432,356 | 3/1969 | Christianson | 429/23 X |
| 3,915,747 | 10/1975 | Summers et al. | 429/23 |
| 4,000,003 | 12/1976 | Baker et al. | 429/9 X |
| 4,677,037 | 6/1987 | Takabayashi | 429/9 |

Primary Examiner—Anthony Skapars
Attorney, Agent, or Firm—Spencer & Frank

[57] ABSTRACT

In a generator system having a fuel cell and a battery to which the output current from the fuel cell can be supplied, in the case of a sudden variation in load, a battery supplies the power to the load until the fuel cell responds to the sudden variation in load. After the output power derived from the fuel cell itself becomes sufficient to be supplied to the load, an excess of the power supplied to the load is charged into the battery.

19 Claims, 7 Drawing Sheets

GENERATOR SYSTEM UTILIZING A FUEL CELL

BACKGROUND OF THE INVENTION

1. Field of the Invention

The present invention relates to a generator system utilizing a fuel cell and more particularly to a generator system utilizing a fuel cell capable of controlling the output of the fuel cell in response to an amount of energy variations in load.

2. Description of the Prior Art

The conventional generator system utilizing a fuel cell is in general designed and constructed to deliver a constant output as shown in FIGS. 1 or 2.

FIG. 1 shows a conventional generator system utilizing a fuel cell which is driven while a fuel cell is connected to a power supply of a system. The generator system utilizing a fuel cell shown in FIG. 1 comprises a raw material tank 1 for storing therein a material to be reformed; 2, a reformer adapted to produce a reformed gas by reforming the raw material fed from the raw material tank 1; 4, a fuel cell; 10, a DC/DC converter; 11, an inverter; 8A, a system power supply; 9, a load; 14B, a controller which is, for instance, in the form of a microprocessor and which controls all about the generator system utilizing a fuel cell; and 30 a generator system utilizing a fuel cell.

The output power $P_F$ derived from the fuel cell 4 is applied through the DC/DC converter 10 to the inverter 11 so that the DC power is converted into the AC power. The inverter output power $P_I$, that is, the fuel cell output $P_F$ is delivered to the load 9. In this case, the AC power $P_L$ delivered to the load 9 is equal to $P_I$. As the load 9 is increased, the power supply must be increased accordingly, but when the output power $P_F$ delivered from the fuel cell is not sufficient, the power Ps from the power supply 8A must be combined with the output $P_I$ from the inverter 11 into the power $P_L$ which is supplied to the load 9. Therefore, the generator system utilizing a fuel cell is driven under the control of the controller 14B.

FIG. 2 shows a system consisting of the combination of a fuel cell and a battery, thereby supplying the power to the load. Reference numeral 1 represents a raw material tank; 2, a reformer; 4, a fuel cell; and 40 a generator system utilizing a fuel cell. The output $P_F$ derived from the fuel cell 4 is converted into a direct current by the DC/DC converter 10, whereby the DC/DC converter output power Pc.

The output Pc from the DC/DC converter 10 is constant and is delivered as the output $P_L$ and the output $P_B$ to the load 9 and the battery 8, respectively. It follows, therefore, when the value of the load 9 is light, an excess of the power $P_L$ delivered to the load 9 is supplied as the excess power $P_B$ to charge the battery 8. On the other hand, when the magnitude of the load 9 is heavy, the controller 14B operates in such a manner that in addition to the output power Pc from the DC/DC converter 10, the output power $P_B$ from the battery 8 is also delivered as the power $P_L$ to the load 9.

However, the above-described conventional generator systems utilizing a fuel cell have a common problem that it is extremely difficult to control the magnitude of the fuel cell output immediately in response to the variations in load.

This problem is caused by the characteristics of the reformer 2 shown in FIGS. 1 or 2. The reformer 2 evaporates a raw material to be reformed such as the mixture of water and methanol delivered from the raw material tank 1 and produces the hydrogen gas, which is a fuel, by a chemical reaction utilizing a reforming catalyst. The response time required for the reforming the raw material into the hydrogen gas in response to the instruction from the controller 14B is of the order of 0.5-2 minutes so that it is impossible to produce the required volume of the hydrogen gas within a time less than above. On the other hand, the response time of the load is of the order of microseconds, so that the response of the fuel cell output power $P_F$ lags behind in time with respect to the variations in load.

Then, in the case the generator system utilizing a fuel cell is driven, it is necessary to control the generator system utilizing a fuel cell by considering the response characteristic of the reformer 2 and the load 9.

Therefore, both the conventional generator systems utilizing a fuel cell have a problem that the output power delivered from the fuel cell to be applied to the load 9 cannot be controlled in response to the variations in load 9.

SUMMARY OF THE INVENTION

In view of the above, the primary object of the present invention is to provide a generator system utilizing a fuel cell which substantially solve the abovementioned problem so that the output derived from the fuel cell is controlled immediately in response to the variations in load.

In the first aspect of the present invention, in a method for controlling a generator system having the fuel cell and a battery to which the output current from the fuel cell is supplied, the method comprises the steps of:

performing a first adjustment of adjusting the supply of the power to a load by the battery in response to the sudden variation in load until the fuel cell responds to the sudden variation in load; and controlling the power supplied from the fuel cell while performing a second adjustment of adjusting the supply of the power to the load by the fuel cell after the fuel cell responds to the sudden variation in load.

Here, the step of performing the first adjustment may include a step of converting the DC power delivered from the battery into the AC power which is supplied to the load.

The response of the fuel cell in the case of the sudden variation in load may be delayed in time by an integrator.

The step of performing the second adjustment may include a step of detecting the power to be supplied to the load.

The power to be supplied to the load may be detected by an AC transducer.

The step of performing the second adjustment may include a step of setting the power to be charged into the battery.

The step of performing the second adjustment may include a step of converting the DC power delivered from the battery into the AC power which in turn is supplied to the load.

The control of the adjustment of the supply of the power to the load from the fuel cell may be accomplished by a controller for auxiliary devices.

The controller for auxiliary devices may comprise an arithmetic unit, a pluse width modulator and power elements.

The arithmetic unit may comprise a function generator in the form of a CPU, an operational amplifier and one or more resistors.

In the second aspect of the present invention, a generator system having a fuel cell and a battery to which the output current from the fuel cell can be supplied, comprises:

- a first adjustment means for adjusting the output current derived from the fuel cell;
- a second adjustment means for adjusting the output current generated in the fuel cell;
- a converter means for converting the DC power supplied from the first adjustment means and the battery into the AC power to be supplied to a load;
- a first detector means for detecting the power supplied to the load from the converter means;
- a second detector means for detecting the power supplied to the second adjustment means from the output side of the first adjustment means;
- a setting means for setting a power to be charged to the battery;
- an arithmetic means for calculating the detection signal representative of the power to be supplied to the load from the first detector means into the value prior to be supplied to the converter means;
- an adder means for adding the output signal derived from the arithmetic means, the setting signal derived from the setting means and the detection signal derived from the second detector means;
- a first controll means for controlling the first adjustment means in response to the output derived from the adder by delaying a time interval corresponding to the delay in response of the fuel cell; and
- a second controll means for controlling the second adjustment means in response to the output from the adder means.

Here, the second adjustment means may include an air blower for supplying reaction air to the fuel cell.

The converter means may have an inverter.

Each of the first and second detector means may have an AC transducer.

The arithmetic means may have a function generator in the form of a CPU and a divider.

The first control means may have a fuel cell current detector, an integrator and an adder.

The fuel cell current detector may have a Hall current transformer.

The second control means may comprise an arithmetic unit, a pluse width modulator and power elements.

The arithmetic unit may have a function generator in the form of a CPU, an operational amplifier and one or more resistors.

With the above-described construction, the present invention controls the output delivered from the fuel cell in response to the variations in load so that the power can be delivered to the load in a stable manner.

Furthermore, in response to the sudden increase in load, the battery backs up the fuel cell to supply the power to the load until the reformer responds, whereby a slow response of the reformer is compensated and when the power output from the fuel cell becomes sufficient enough to supply the load, an excess of the output power to be supplied to the load is supplied to the battery to charge the same so that the stable power supply to the load is ensured.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
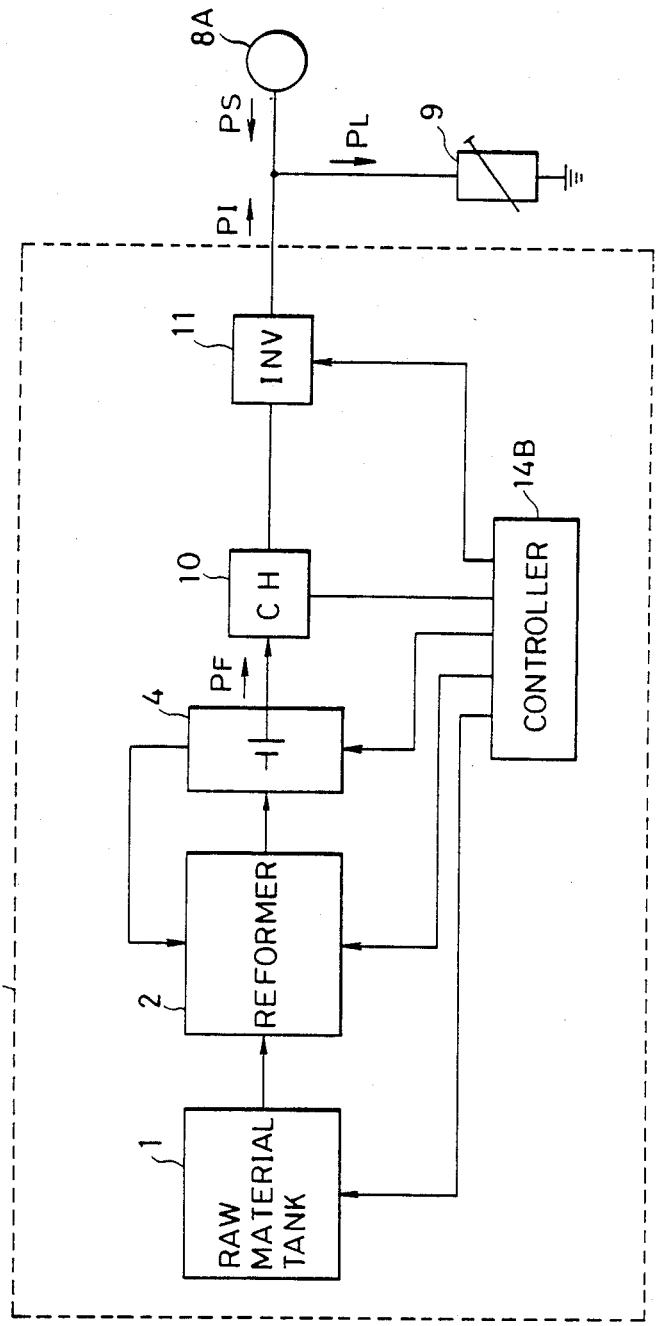
FIG. 1 is a block diagram showing a conventional generator system utilizing a fuel cell.
Figure 2:
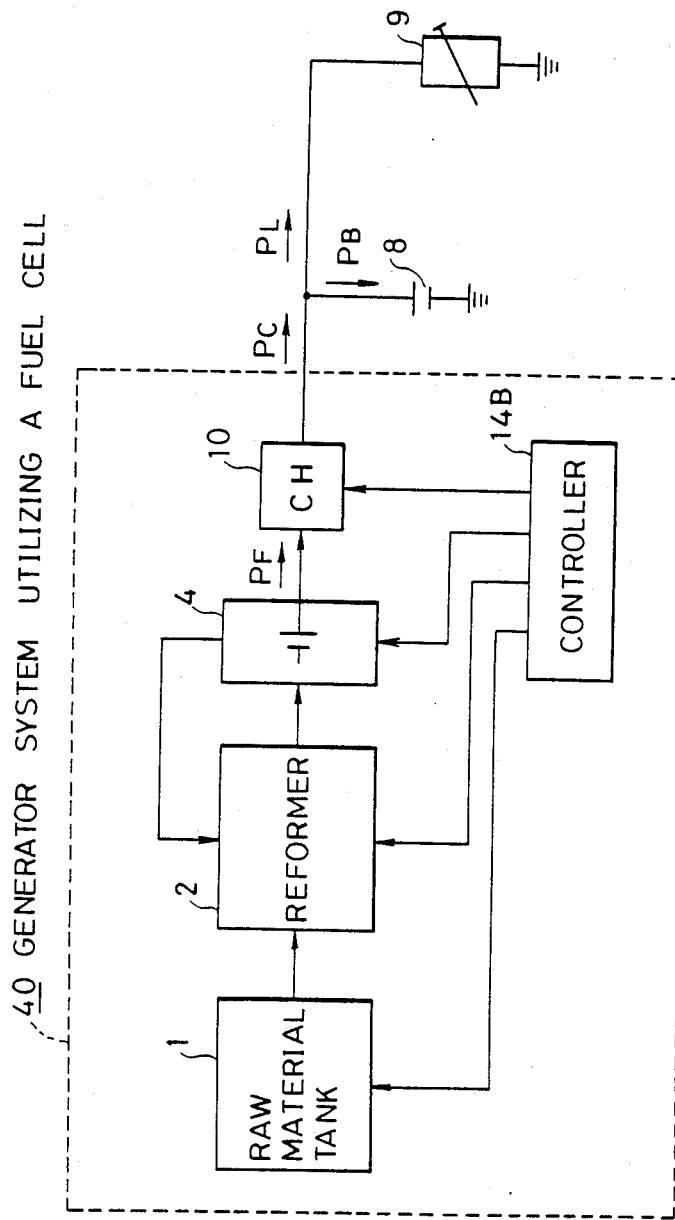
FIG. 2 is a block diagram showing another conventional generator system utilizing a fuel cell.
Figure 3:
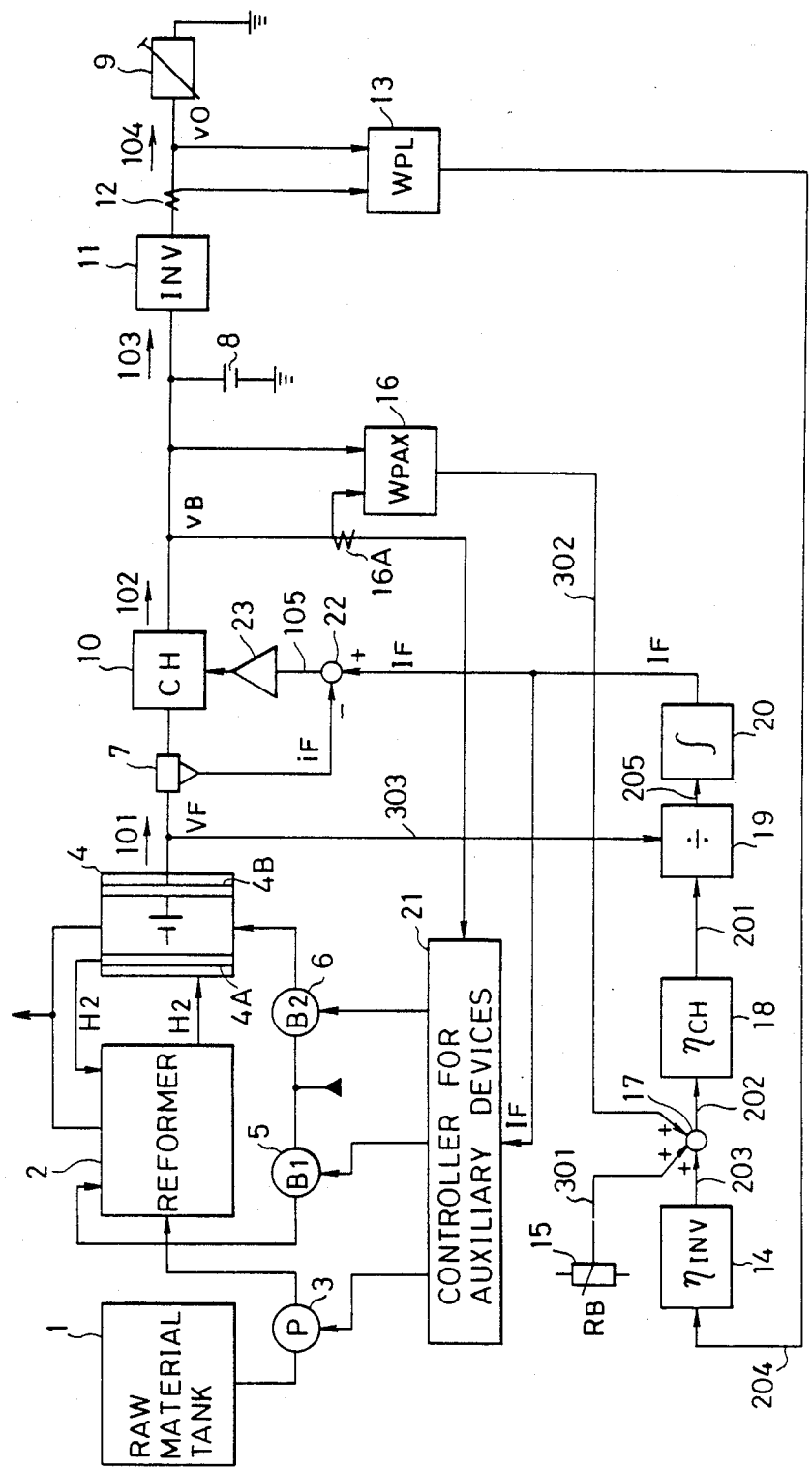
FIGS. 3 and 4 are block diagrams showing a preferred embodiment of the present invention.

FIG. 3 is a block diagram of one embodiment of the present invention. In FIG. 3, reference numeral 1 designates a raw material tank which stores therein, for instance, methanol and water. Reference numeral 2 denotes a reformer for reforming the raw material delivered from the raw material tank 1 through a raw material feed pump 3 to produce the reformed gas $H_2$. The reformed gas $H_2$ is delivered to a fuel electrode 4A of a fuel cell 4. Reference numeral 5 denotes an air blower for combustion for feeding to the reformer 2 air sufficient volume to continue the reforming reaction in the reactor 2. Reference numeral 6 denotes an air blower for reaction for delivering air to an air electrode of the fuel cell 4.

Reference numeral 7 represents a fuel cell current detector which is adapted to detect the direct current delivered to a battery 8 and a load 9 and may be a shunt or a Hall current transformer. In this embodiment, the Hall current transformer is used. The battery 8 is interconnected between a DC/DC converter 10 and an inverter 11 which converts the DC output delivered from the DC/DC converter 10 into an alternating current. Reference numeral 12 denotes a load current detector to detect the value of the current to be supplied to the load 9. The value of the current thus detected and the value of the voltage $v_0$ are delivered to a load power arithmetic unit 13 to detect the value of the load power $W_{PL}$ which in turn is delivered as a load power signal 204.

When the output from the inverter 11 is a single phase alternating current, WTT2-83A-12 (the product of DAiichi Keiki Co., Ltd.) may be used, but when the output from the inverter 11 is a three phase alternating current, WTT2-83A-33 (also the product of the above-mentioned company) may be used.

The load power signal 204 is supplied to the inverter efficiency arithmetic unit 14 which in turn delivers an inverter efficiency signal 203. In this case, the inverter efficiency signal 203 is equal to an input power signal 103 applied to the inverter 11.

Figure 4:
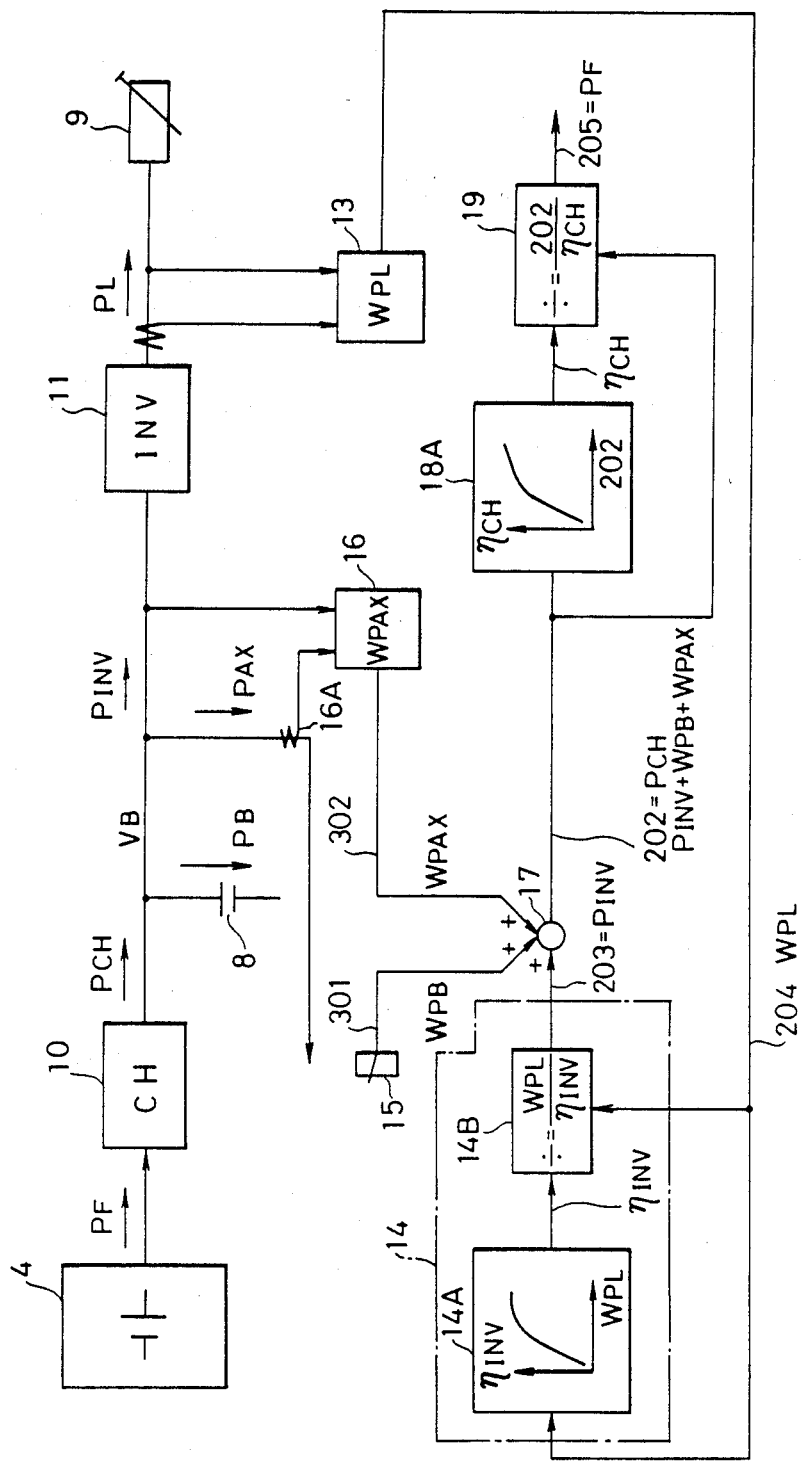
Figure 5:
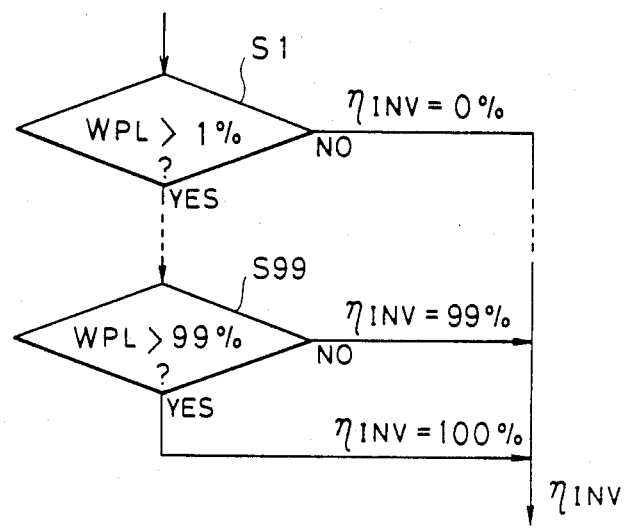
FIG. 5 is a flowchart illustrating an example of steps accomplished by an inverter efficiency arithmetic unit.

As shown in FIG. 4, the inverter efficiency arithmetic unit 14 comprises, for instance, a function generator in the form of a CPU 14A and a divider 14B. The function generator 14A is so designed and constructed the $\eta_{INV} + \int W_{PL}$ is obtained in response to a predetermined efficiency curve or an efficiency curve obtained from the test data of the inverter 11, so that $\eta_{INV}$ is obtained in response to the load power $W_{PL}$. Instead of obtaining $\eta_{INV}$ in the manner described above, it may be obtained in accordance with the sequence as shown in FIG. 5. More particularly, when $W_{PL}$ (that is, the value represented by the signal 204) is detected to be higher than 1% in first step S1, the operation proceeds to the second step, but when it is 1% or less, $\eta_{INV}=0$. Same steps are repeated to detect $\eta_{INV}$ until step S99. When $W_{INV}$ is detected to exceed 99% in step S99, $\eta_{INV}$ becomes 100%.

$\eta_{INV}$ obtained from the function generator 14A is inputted to the divider 14B, so that an inverter efficiency signal 203 representative of $W_{PL}/\eta_{INV}=P_{INV}$ is obtained. Here, $P_{INV}$ represents the input power applied to the inverter 11.

Again in FIG. 3, reference numeral 15 represents a device for setting a voltage to be applied to the battery and is composed of, for instance, a variable resistor to set the value of the power to be supplied to the battery; and 16, a power arithmetic unit for auxiliary devices to calculate the power which is delivered from the DC/DC converter 10 to the controller for auxiliary devices 21 to be described in more detail hereinafter. The value of the power for auxiliary devices is detected in response to the signals representative of the value of the current detected by the current detector for auxiliary devices 16A and the value of the voltage $v_B$. The power arithmetic unit for the auxiliary devices 16 may be of the same type of the load power arithmetic unit 13. Applied to an adder 17 are the auxiliary power signal 302 derived from the arithmetic unit 16, an inverter efficiency signal 203 delivered from the inverter efficiency arithmetic unit 14 and the battery charging power signal 301 delivered from the device 15 for setting a voltage to be applied to the battery, so that an addition signal 202 is obtained and is equal to the output signal 102 representative of the voltage vB delivered from the DC/DC converter 10. In response to the addition signal 202, the stepped-up voltage efficiency arithmetic unit 18 calculates a stepped-up voltage efficiency signal 201 which is equal to the output signal 101 and is applied to a divider 19 and then an integrator 20, so that a fuel cell output current command signal $I_F$ is obtained.

Figure 6:
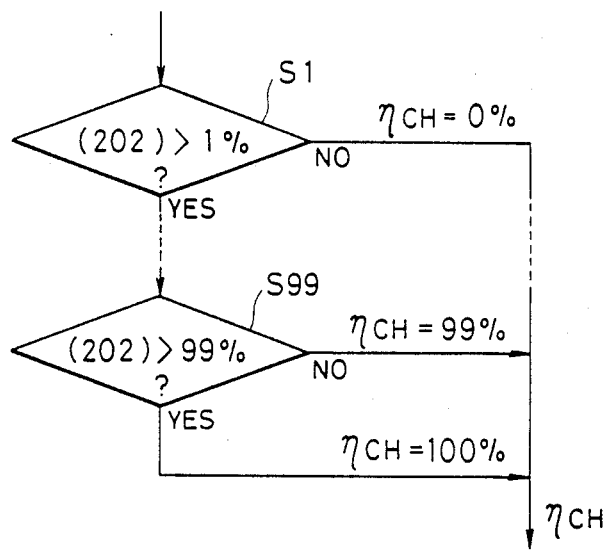
FIG. 6 is a flowchart illustrating an example of steps accomplished by a stepped-up voltage efficiency arithmetic unit.

The stepped-up voltage efficiency arithmetic unit 18 may be composed of, for instance, a function generator 18A in the form of a CPU as shown in FIG. 4. The function generator 18A generates a function of $\eta_{CH}= \int$ (signal 202) based upon a predetermined efficiency curve or an efficiency curve obtained from the test data and in response to the value (202) of the signal 202$\eta_{CH}$ is obtained. Instead of obtaining the value $\eta_{CH}$ in the manner described above, it may be obtained in accordance with the flowchart as shown in FIG. 6. In the latter case, in step S1 when the value (202) of the signal 202 is detected to be 1% or less, the value of $\eta_{CH}$ becomes zero. If the value (202) exceeds 1%, the program proceeds to the next step. The same operation is repeated until step S99 to detect the value (202) of the signal 202. In step S99, when the value (202) of the signal 202 is detected to exceed of 99%, the value of $\eta_{CH}$ is defined as 100%. The value $\eta_{CH}$ thus obtained is delivered to a divider 19, so that the fuel cell output current signal 205 representing $P_{CH}/\eta_{CH}=P_F$.

The reason why the divider 19 is used is that the output delivered from the fuel cell 4 is dependent on the output current thereof. More particularly, the hydrogen gas produced in the reformer 2 is equal in volume to the hydrogen gas supplied to the fuel cell 4 and the output current derived from the fuel cell 4 is dependent on the volume of the hydrogen gas.

It follows therefore that the signal 201 representative of the fuel cell output power is divided by a signal 303 representative of the fuel cell output voltage $V_F$, the fuel cell output current signal 205 which is required for generating a fuel cell output current command signal $I_F$ can be obtained. The integrator 20 is provided in order to delay the signal 205 by an optimum time interval for generating the fuel cell output current command signal $I_F$ in response to the response time (of the order of 0.5–2 minutes) of the reformer 2. The function of the above-described circuits 13, 14, 16, 17, 18, 19 and 20 may be accomplished by the microprocessor.

The fuel cell output current instruction signal $I_F$ thus obtained is applied to a controller 21 for the auxiliary devices 3, 5 and 6 which may be composed of a microprocessor and in response to the command signal $I_F$, the raw material feed pump 3, the air blower for combustion 5 and the blower for reaction 6 are controlled so that the output current delivered from the fuel cell 4 itself can be controlled.

Figure 7:
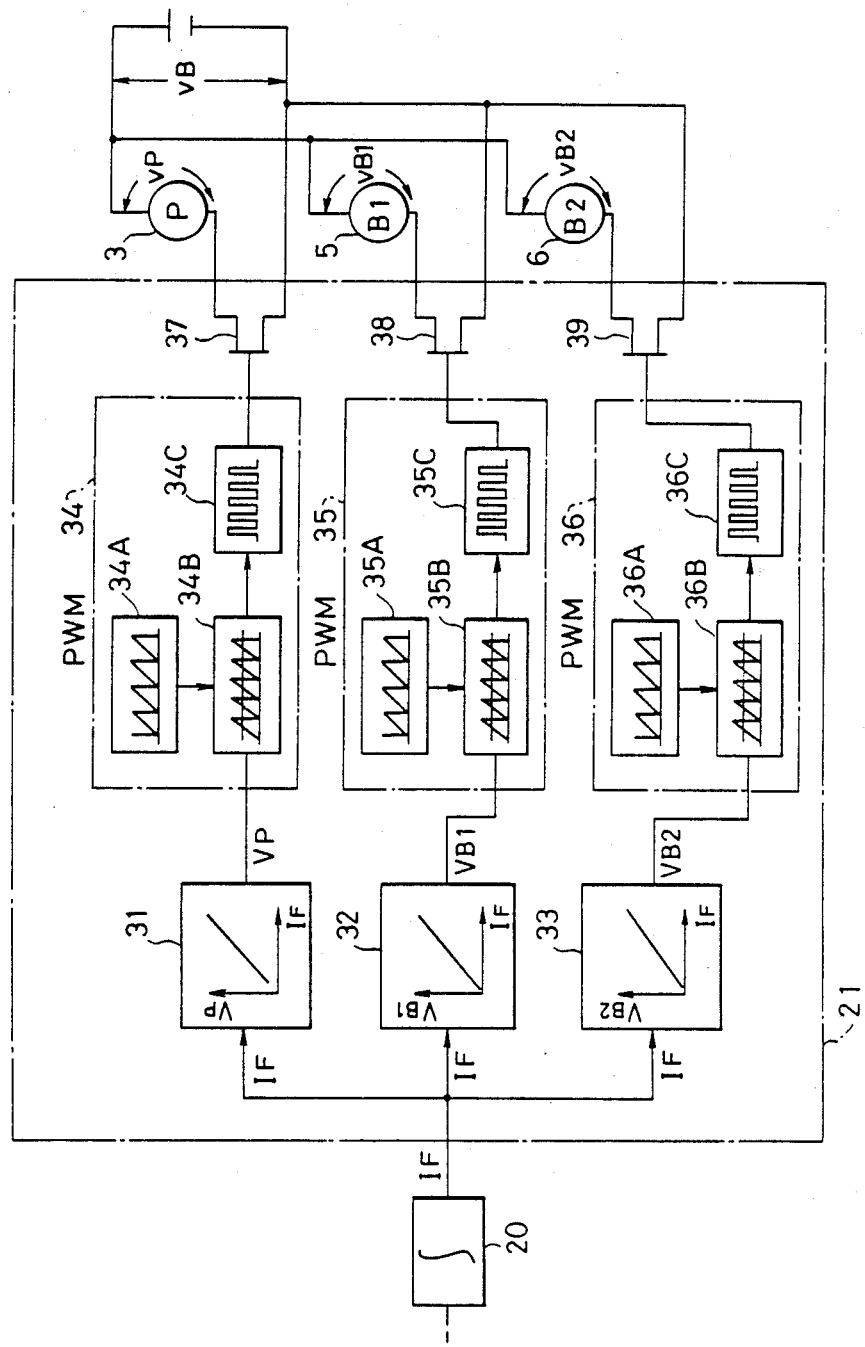
FIG. 7 is a block diagram showing a construction of a controller for auxiliary devices of another preferred embodiment of the present invention.
Figure 8:
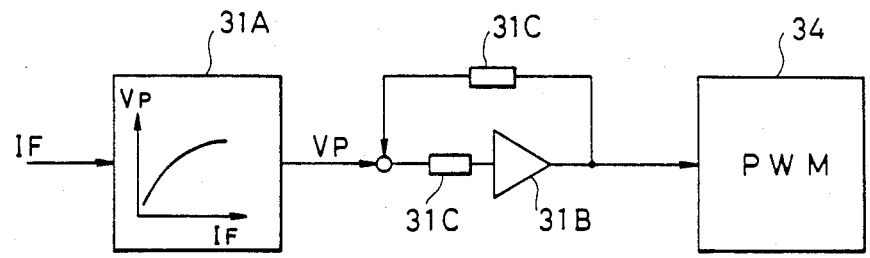
FIG. 8 is a block diagram showing an arithmetic unit of the controller for auxiliary devices as shown in FIG. 7.
Figure 9:
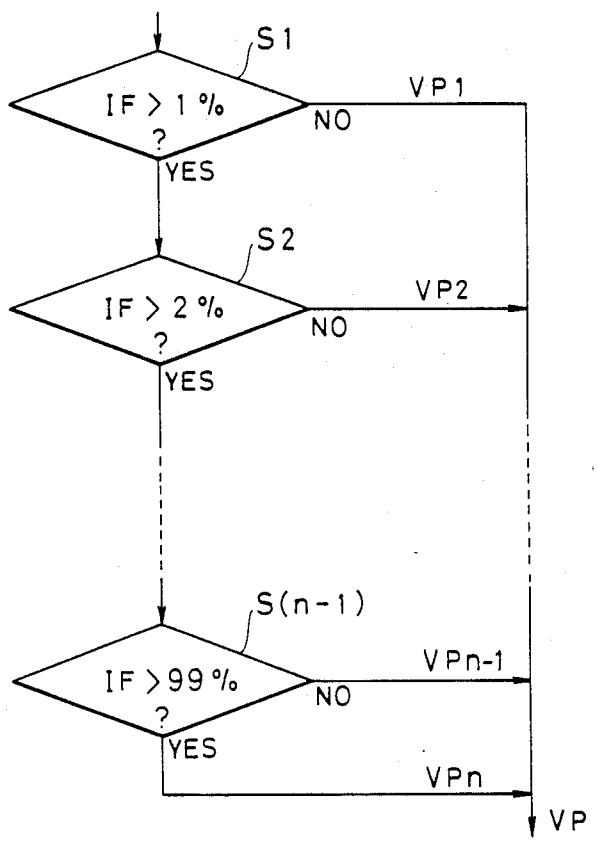
FIG. 9 is a flowchart illustrating an example of control steps accomplished the arithmetic unit shown in FIG. 8.

FIG. 7 is a block diagram of the controller 21. Reference numerals 31, 32 and 33 represent arithmetic units, respectively, which carry out the calculations in order to control the feed pump 3, the air blower for combustion 5 and the air blower for reaction 6, respectively. FIG. 8 is a block diagram of the arithmetic unit 31 and FIG. 9 shows the control procedure carried out by the arithmetic unit 31.

In FIG. 8, reference numeral 31A denotes a function generator in the form of a CPU (Central Processing Unit); 31B, an operational amplifier; and 31C, a resistor. The arithmetic unit 31 is so designed and constructed that the function generator 31A generates a desired function $V_P$ in response to the value of the $I_F$ delivered from the integrator 20.

The mode of operation of the arithmetic unit 31 will be described with reference to the flowchart shown in FIG. 9. In first step $S_I$, it is detected whether or not the value of the current $I_F$ derived from the integrator 20 is in excess of 1% and when the detected current is 1% or less, a voltage signal $V_P (=V_{P1})$ is supplied to a pulse width modulator 34 (FIG. 7). However, when the value of the current $I_F$ exceeds 1%, the operation proceeds to next step S2 in order to detect whether or not the value of the current $I_F$ is in excess of 2%. In like manner, the value of the current IF is sequentially detected until last step S(n−1). The detected voltage signals $V_P$ are applied to the pulse width modulator 34.

So far the case of obtaining the voltage signal $V_P$ for energizing the feed pump 3 has been described, the voltage signal $V_{B1}$ for energizing the air blower for combustion 5 and the voltage signal $V_{B2}$ for energizing the air blower for reaction 6 are obtained in a manner substantially similar to that described above.

The voltages $V_P$, $V_{B1}$ and $V_{B2}$ are not linearly proportional to the value of the current $I_F$ and they can be calculated by the CPU 31A as $V_P = f_1 \cdot I_F$, $V_{B1} = f_2 \cdot I_F$ and $V_{B2} = f_3 \cdot I_F$.

In FIG. 7, reference numerals 34, 35 and 36 designate pulse width modulators, respectively, each comprising an oscillator 34A (35A, 36A) for generating the saw tooth waveform signal, a comparator 34B (35B, 36B) and a pulse generator 34C (35C, 36C). The comparator 34B (35B, 36B) is adapted to deliver the comparison output signal when the level of the saw tooth waveform signal exceeds the voltage signal derived from the arithmetic unit 31, (32, 33). Each of the pulse generators 34C, 35C and 36C generates a rectangular pulse in response to the output from its corresponding comparator.

Reference numerals 37, 38 and 39 represent high power bipolar transistors or power elements in the form of a power MOS FET and are driven in response to the output pulses derived from the pulse generators 34C, 35C and 36C.

The voltage signals $V_P$, $V_{B1}$ and $V_{B2}$ derived from the arithmetic units 31, 32 and 33, respectively, are applied to the comparators 34B, 35B and 36B, respectively. The pulse width derived from each of the pulse generators 34C, 35C and 36C is determined in response to the level of each corresponding voltage signal. The pulses generated by the pulse generators 34C, 35C and 36C are applied as the PWM signals to the corresponding power elements 37, 38 and 39, respectively. The frequency of the saw tooth waveform signal derived from each oscillator becomes a switching frequency of each corresponding power element 37 (38, 39).

The pulse generated by the pulse generators 34C, 35C and 36C have a narrow pulse duration when the output power delivered from the fuel cell 4 is low; that is, when the value of the current $I_F$ is low, so that the time interval when the power elements 37, 38 and 39 are on is short. As a result, the rotational speeds of the motors (not shown) for driving the feed pump 3, the air blower for combustion 5 and the air blower for reaction 6 become slower so that it suffices to supply the raw material and air in small amounts. On the other hand, when the output power derived from the fuel cell 4 is high, the pulse width of the pulses generated by the pulse generators 34C, 35C and 36C are increased, so that the rotational speeds of the motors for driving the feed pump 3, the air blower for combustion 5 and the air blower for reaction 6 becomes faster and the amounts of the raw material and air to be supplied are increased.

Therefore, because of the switching operations by the power elements in response to the PWM signals delivered from the pulse width modulators 34, 35 and 36, the voltage $v_P$, $v_{B1}$ and $v_{B2}$ applied to the driving motors for driving the feed pump 3, the air blower for combustion 5 and the air blower for reaction 6 are varied so that it becomes possible to control the feed pump 3, the air blower for combustion 5 and the air blower for reaction 6.

The fuel cell output current command signal $I_F$ derived from the integrator 20 and the output signal $i_F$ derived from the fuel cell current detector 7 are added by an adder 22 and the resultant signal or the control signal 105 is applied to the DC/DC converter 10 through the fuel cell current regulator 23 in the form of an amplifier. The DC/DC converter 10 is interconnected between the fuel cell 4 and the battery 8 and in response to the control signal 105, determines the optimum values of the output currents supplied from the fuel cell 4 to the battery 8 and the load 9.

In the embodiment just described above, the power from the battery 8 discharges the power to the load 9 in response to the increase in load 9 and the discharged direct current is inverted into the AC by the inverter 11 and then applied to the load 9. During the power is derived from the battery 8 to the load 9 in the manner described above, the integrator 20 responds to determine an optimum time delay so that the output current from the fuel cell 4 is controlled in response to the variation in the load 9. When the supply of the power to the load 9 reaches the steady state, the power is derived from the fuel cell 4 to the auxiliary devices such as the battery 8, the raw material feed pump 3 and so on and to the load 9.

As described above, according to the present invention, in response to the variations in load, the output from the fuel cell is controlled so that the stable output can be supplied to the load.

Furthermore, in response to the sudden increase in load, the back-up by the battery is available so that until the reformer responds, the battery supplies the power to the load, thereby compensating for a slow response to the reformer. After the output from the fuel cell itself to be supplied to the load 9 reaches a sufficient level, an excess of the output power to be delivered to the load is supplied to the battery to charge the same. As a result, the stable output can be always supplied to the load.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

WHAT IS CLAIMED IS:

1. A method for controlling a generator system having a fuel cell and a battery to which the output current from said fuel cell is supplied, said method comprising the steps of:
   performing a first adjustment of adjusting the supply of the power to a load by said battery in response to the sudden variation in load until said fuel cell responds to said sudden variation in load; and
   controlling the power supplied from said fuel cell while performing a second adjustment of adjusting the supply of the power to said load by said fuel cell after said fuel cell responds to the sudden variation in load.

2. A method as claimed in claim 1, wherein said step of performing said first adjustment includes a step of converting the DC power delivered from said battery into the AC power which is supplied to said load.

3. A method as claimed in claim 1, wherein the response of said fuel cell in the case of the sudden variation in load is delayed in time by an integrator.

4. A method as claimed in claim 1, wherein said step of performing said second adjustment includes a step of detecting the power to be supplied to said load.

5. A method as claimed in claim 4, wherein the power to be supplied to said load is detected by an AC transducer.

6. A method as claimed in claim 1, wherein said step of performing said second adjustment includes a step of setting the power to be charged into said battery.

7. A method as claimed in claim 1, wherein said step of performing said second adjustment includes a step of converting the DC power delivered from said battery into the AC power which in turn is supplied to said load.

8. A method as claimed in claim 1, wherein the control of the adjustment of the supply of the power to said load from said fuel cell is accomplished by a controller for auxiliary devices.

9. A method as claimed in claim 8, wherein said controller for auxiliary devices comprises an arithmetic unit, a pluse width modulator and power elements.

10. A method as claimed in claim 9, wherein said arithmetic unit comprises a function generator in the form of a CPU, an operational amplifier and one or more resistors.

11. A generator system having a fuel cell and a battery to which the output current from said fuel cell can be supplied, comprising:
a first adjustment means for adjusting the output current derived from said fuel cell;
a second adjustment means for adjusting the output current generated in said fuel cell;
a converter means for converting the DC power supplied from said first adjustment means and said battery into the AC power to be supplied to a load;
a first detector means for detecting the power supplied to said load from said converter means;
a second detector means for detecting the power supplied to said second adjustment means from the output side of said first adjustment means;
a setting means for setting a power to be charged to said battery;
an arithmetic means for calculating the detection signal representative of the power to be supplied to said load from said first detector means into the value prior to be supplied to said converter means;
an adder means for adding the output signal derived from said arithmetic means, the setting signal derived from said setting means and the detection signal derived from said second detector means;
a first controll means for controlling said first adjustment means in response to the output derived from said adder by delaying a time interval corresponding to the delay in response of said fuel cell; and
a second controll means for controlling said second adjustment means in response to the output from said adder means.

12. A generator system as claimed in claim 11, wherein said second adjustment means includes an air blower for supplying reaction air to said fuel cell.

13. A generator system as claimed in claim 11, wherein said converter means has an inverter.

14. A generator system as claimed in claim 11, wherein each of said first and second detector means has an AC transducer.

15. A generator system as claimd in claim 11, wherein said arithmetic means has a function generator in the form of a CPU and a divider.

16. A generator system as claimed in claim 11, wherein said first control means has a fuel-cell-current detector, an integrator and an adder.

17. A generator system as claimed in claim 16, wherein said fuel-cell-current detector has a Hall current transformer.

18. A generator system as claimed in claim 11, wherein said second control means comprises an arithmetic unit, a pluse-width modulator and power elements.

19. A generator system as claimed in claim 18, wherein said arithmetic unit has a function generator in the form of a CPU, an operational amplifier and one or more resistors.

* * * * *